United States Patent
Beringer et al.

(10) Patent No.: US 8,782,530 B2
(45) Date of Patent: Jul. 15, 2014

(54) METHOD AND SYSTEM FOR PROVIDING A USER INTERFACE IN A COMPUTER

(75) Inventors: Joerg Beringer, Los Altos, CA (US);
Kai S. Richter, Muehltal-Traisa (DE);
Reiner P. Hammerich, Rauenberg (DE);
Dominik R. Tornow, Palo Alto, CA (US)

(73) Assignee: SAP AG, Walldorf (DE)

( * ) Notice: Subject to any disclaimer, the term of this patent is extended or adjusted under 35 U.S.C. 154(b) by 304 days.

(21) Appl. No.: 12/411,231

(22) Filed: Mar. 25, 2009

(65) Prior Publication Data

US 2010/0251133 A1   Sep. 30, 2010

(51) Int. Cl.
*G06F 3/00*   (2006.01)
*G06F 3/048*   (2013.01)
*G06F 3/0484*   (2013.01)
*G06F 3/0481*   (2013.01)

(52) U.S. Cl.
CPC .............. *G06F 3/048* (2013.01); *G06F 3/0484* (2013.01); *G06F 3/0481* (2013.01)
USPC ............................ 715/744; 715/754; 715/804

(58) Field of Classification Search
CPC ..... G06F 3/048; G06F 3/0484; G06F 3/0481; G06F 9/4443
USPC .......................................... 715/744, 754, 804
See application file for complete search history.

(56) References Cited

U.S. PATENT DOCUMENTS

| | | | | |
|---|---|---|---|---|
| 4,617,643 A | * | 10/1986 | Klock et al. | 715/273 |
| 4,777,485 A | * | 10/1988 | Costello | 345/572 |
| 4,845,644 A | * | 7/1989 | Anthias et al. | 715/803 |
| 5,040,131 A | * | 8/1991 | Torres | 715/810 |
| 5,197,124 A | * | 3/1993 | Busboom et al. | 715/754 |
| 5,201,033 A | * | 4/1993 | Eagen et al. | 715/754 |
| 5,208,903 A | * | 5/1993 | Curry | 345/594 |
| 5,214,756 A | * | 5/1993 | Franklin et al. | 715/839 |
| 5,255,358 A | * | 10/1993 | Busboom et al. | 715/843 |
| 5,295,241 A | * | 3/1994 | Eagen et al. | 715/744 |
| 5,345,553 A | * | 9/1994 | Busboom et al. | 715/744 |
| 5,388,198 A | * | 2/1995 | Layman et al. | 715/812 |
| 5,430,836 A | * | 7/1995 | Wolf et al. | 715/744 |
| 5,461,716 A | * | 10/1995 | Eagen et al. | 715/788 |
| 5,467,441 A | * | 11/1995 | Stone et al. | 345/619 |
| 5,517,405 A | | 5/1996 | McAndrew et al. | |

(Continued)

OTHER PUBLICATIONS

GDC 09 OnLive Introduces The Future of Gaming.*

(Continued)

*Primary Examiner* — Steven Sax
*Assistant Examiner* — David Choi
(74) *Attorney, Agent, or Firm* — Blakely, Sokoloff, Taylor & Zafman, LLP

(57) ABSTRACT

Presenting a user interface in a computing system, where device-specific information is added to data defined generically with respect to a particular device or presentation technology. The generic definition can be provided via template representing data and functionality of a user interaction, which is presented to a user in a specific way on a specific user interface. A class can be derived in the user interface from the template and instantiated with data in accordance with particulars of a data type. Data can be presented via instructions representing basic presentation patterns defining how data is to be presented on a user interface. Identifications of the instructions are matched to instructions to generate instructions specific to a presentation environment.

17 Claims, 15 Drawing Sheets

(56) References Cited

U.S. PATENT DOCUMENTS

| | | | |
|---|---|---|---|
| 5,596,690 A * | 1/1997 | Stone et al. | 345/630 |
| 5,652,851 A * | 7/1997 | Stone et al. | 715/804 |
| 5,682,169 A * | 10/1997 | Botterill et al. | 345/2.1 |
| 5,710,896 A * | 1/1998 | Seidl | 715/744 |
| 5,727,141 A * | 3/1998 | Hoddie et al. | 345/475 |
| 5,729,704 A * | 3/1998 | Stone et al. | 715/804 |
| 5,754,857 A | 5/1998 | Gadol | |
| 5,826,239 A | 10/1998 | Du et al. | |
| 5,923,330 A * | 7/1999 | Tarlton et al. | 345/419 |
| 5,940,075 A * | 8/1999 | Mutschler et al. | 715/760 |
| 5,991,733 A | 11/1999 | Aleia et al. | |
| 6,073,109 A | 6/2000 | Flores et al. | |
| 6,100,885 A * | 8/2000 | Donnelly et al. | 715/762 |
| 6,137,484 A * | 10/2000 | Hoddie et al. | 715/203 |
| 6,282,531 B1 | 8/2001 | Haughton et al. | |
| 6,343,271 B1 | 1/2002 | Peterson et al. | |
| 6,640,238 B1 | 10/2003 | Bowman-Amuah | |
| 6,968,553 B1 * | 11/2005 | Theeten | 719/311 |
| 7,000,219 B2 | 2/2006 | Barrett et al. | |
| 7,096,222 B2 | 8/2006 | Kern et al. | |
| 7,100,195 B1 | 8/2006 | Underwood | |
| 7,219,107 B2 | 5/2007 | Beringer | |
| 7,425,582 B2 | 9/2008 | Baran, Jr. et al. | |
| 7,428,582 B2 | 9/2008 | Bean et al. | |
| 7,451,152 B2 | 11/2008 | Kraft et al. | |
| 7,603,266 B2 * | 10/2009 | Ramanathan | 703/24 |
| 7,698,656 B2 * | 4/2010 | Srivastava | 715/827 |
| 7,769,619 B1 | 8/2010 | Krysinski et al. | |
| 7,860,946 B1 * | 12/2010 | Bulleit et al. | 709/218 |
| 7,876,779 B2 * | 1/2011 | Wilson | 370/466 |
| 7,917,378 B2 | 3/2011 | Fitzgerald et al. | |
| 7,925,527 B1 | 4/2011 | Flam | |
| 8,127,237 B2 | 2/2012 | Beringer | |
| 8,135,817 B2 | 3/2012 | Motoyama | |
| 8,271,882 B2 | 9/2012 | Botscheck et al. | |
| 8,321,243 B1 | 11/2012 | Harris, Sr. et al. | |
| 8,489,415 B1 | 7/2013 | Ringold | |
| 8,526,925 B2 | 9/2013 | Zellner et al. | |
| 2002/0063734 A1 * | 5/2002 | Khalfay et al. | 345/744 |
| 2003/0023472 A1 | 1/2003 | Lee et al. | |
| 2003/0182458 A1 | 9/2003 | Ali et al. | |
| 2003/0217333 A1 | 11/2003 | Smith et al. | |
| 2004/0015893 A1 * | 1/2004 | Banavar et al. | 717/138 |
| 2004/0046789 A1 | 3/2004 | Inanoria | |
| 2005/0027559 A1 | 2/2005 | Rajan et al. | |
| 2006/0047709 A1 * | 3/2006 | Belin et al. | 707/201 |
| 2006/0149743 A1 | 7/2006 | Mouline et al. | |
| 2006/0200792 A1 | 9/2006 | Hagstrom et al. | |
| 2006/0230348 A1 * | 10/2006 | Fahmy | 715/700 |
| 2007/0033194 A1 | 2/2007 | Srinivas et al. | |
| 2007/0033571 A1 | 2/2007 | Moore et al. | |
| 2007/0192630 A1 * | 8/2007 | Crane et al. | 713/193 |
| 2007/0239503 A1 | 10/2007 | Bhatnagar et al. | |
| 2007/0299828 A1 * | 12/2007 | Lewis et al. | 707/3 |
| 2007/0300185 A1 | 12/2007 | MacBeth et al. | |
| 2008/0004725 A1 * | 1/2008 | Wacker | 700/83 |
| 2008/0082649 A1 | 4/2008 | Gazier et al. | |
| 2008/0140759 A1 | 6/2008 | Conner et al. | |
| 2008/0215757 A1 | 9/2008 | Hellstrom | |
| 2008/0313650 A1 | 12/2008 | Arnquist et al. | |
| 2009/0031284 A1 * | 1/2009 | Shenfield et al. | 717/114 |
| 2009/0044236 A1 * | 2/2009 | Bendiabdallah et al. | 725/87 |
| 2009/0051701 A1 * | 2/2009 | Fleming | 345/619 |
| 2009/0063522 A1 | 3/2009 | Fay et al. | |
| 2009/0083058 A1 | 3/2009 | Beringer et al. | |
| 2009/0106645 A1 * | 4/2009 | Knobel | 715/236 |
| 2009/0112924 A1 | 4/2009 | Harris et al. | |
| 2009/0158268 A1 * | 6/2009 | Pichetti et al. | 717/170 |
| 2009/0171909 A1 * | 7/2009 | Bank et al. | 707/3 |
| 2009/0235167 A1 | 9/2009 | Boyer et al. | |
| 2009/0240840 A1 * | 9/2009 | Habben et al. | 710/10 |
| 2009/0241015 A1 * | 9/2009 | Bender et al. | 715/202 |
| 2009/0260022 A1 | 10/2009 | Louch et al. | |
| 2010/0049628 A1 | 2/2010 | Mannava et al. | |
| 2010/0050097 A1 * | 2/2010 | McGreevy et al. | 715/762 |
| 2010/0064229 A1 * | 3/2010 | Lau et al. | 715/744 |
| 2010/0082641 A1 * | 4/2010 | Rinckes et al. | 707/748 |
| 2010/0125477 A1 | 5/2010 | Mousseau et al. | |
| 2010/0174991 A1 | 7/2010 | Anderson et al. | |
| 2010/0251133 A1 * | 9/2010 | Beringer et al. | 715/744 |

OTHER PUBLICATIONS

Non-Final Office Action for U.S. Appl. No. 11/956,086 Mailed Jun. 8, 2010, 19 pages.
Office Action from U.S. Appl. No. 12/128,453 mailed Oct. 4, 2010, 23 pages.
Final Office Action for U.S. Appl. No. 11/956,086 Mailed Nov. 24, 2010, 26 Pages.
Non-Final Office Action for U.S. Appl. No. 11/803,760 Mailed Dec. 7, 2010, 24 pages.
Final Office Action for U.S. Appl. No. 12/128,453, Mailed Jan. 10, 2011, 17 pages.
Non-Final Office Action for U.S. Appl. No. 12/033,361, Mailed Feb. 17, 2011,13 pages.
Non-Final Office Action for U.S. Appl. No. 12/411,216, Mailed Mar. 28, 2011,15 pages.
Non-Final Office Action for U.S. Appl. No. 12/128,453, Mailed Apr. 26, 2011, 17 pages.
Hollingsworth, David , "Workflow Management Coalition The Workflow Reference Model", Document No. TC00-1003, Document Status—Issue 1.1, Jan. 19, 1995, 55 pages.
Cardoso, Jorge , "Semantic Web Services: Theory, Tools, and Applications", *Information Science Reference*, Hershey, NY, USA, 2007, 1-43 and 191-239.
Davies, John , et al., "Towards the Semantic Web Ontology-Driven Knowledge Management", *John Wiley & Sons, LTD*, Chichester, England, 2003, 1-12 and 91-115.
Shadbolt, Nigel , et al., "The Semantic Web Revisited", *IEEE Intelligent Systems* May/Jun. 2006; Retrieved on Mar. 1, 2009 from http://eprints.ecs.soton.ac.uk/12614/01/Semantic Web Revisted.pdf Published by the IEEE Computer Society, 2006;, pp. 96-101.
Spivack, Nigel , "Making Sense of the Semantic Web", Nov. 2007; Retrieved from the Web on Mar. 11, 2009: http://novaspivack.typepad.com/nova spivacks weblog/files/nova spivack semantic web talk.ppt, 36 pages.
Non-Final Office Action for U.S. Appl. No. 11/803,760, Mailed Jul. 20, 2011, 26 pages.
Final Office Action for U.S. Appl. No. 12/033,361, Mailed Aug. 3, 2011, 7 pages.
Notice of Allowance for U.S. Appl. No. 12/128,453, Mailed Aug. 30, 2011, 14 pages.
Notice of Allowance for U.S. Appl. No. 12/033,361, Mailed Oct. 27, 2011.
Final Office Action for U.S. Appl. No. 11/803,760, Mailed Oct. 31, 2011.
Final Office Action for U.S. Appl. No. 12/411,216, Mailed Oct. 21, 2011, 16 pages.
Office Action from U.S. Appl. No. 12/41,216 mailed Apr. 5, 2012, 21 pages.
Notice of Allowance from U.S. Appl. No. 11/956,086 mailed Feb. 2, 2012, 8 pages.
Final Office Action for U.S. Appl. No. 12/411,216, Mailed Dec. 4, 2012, 22 pages.
Notice of Allowance for U.S. Appl. No. 13/358,725, (Dec. 19, 2013), Whole Document.
Office Action from U.S. Appl. No. 13/358,725, (Jun. 21, 2013), Whole Document.

* cited by examiner

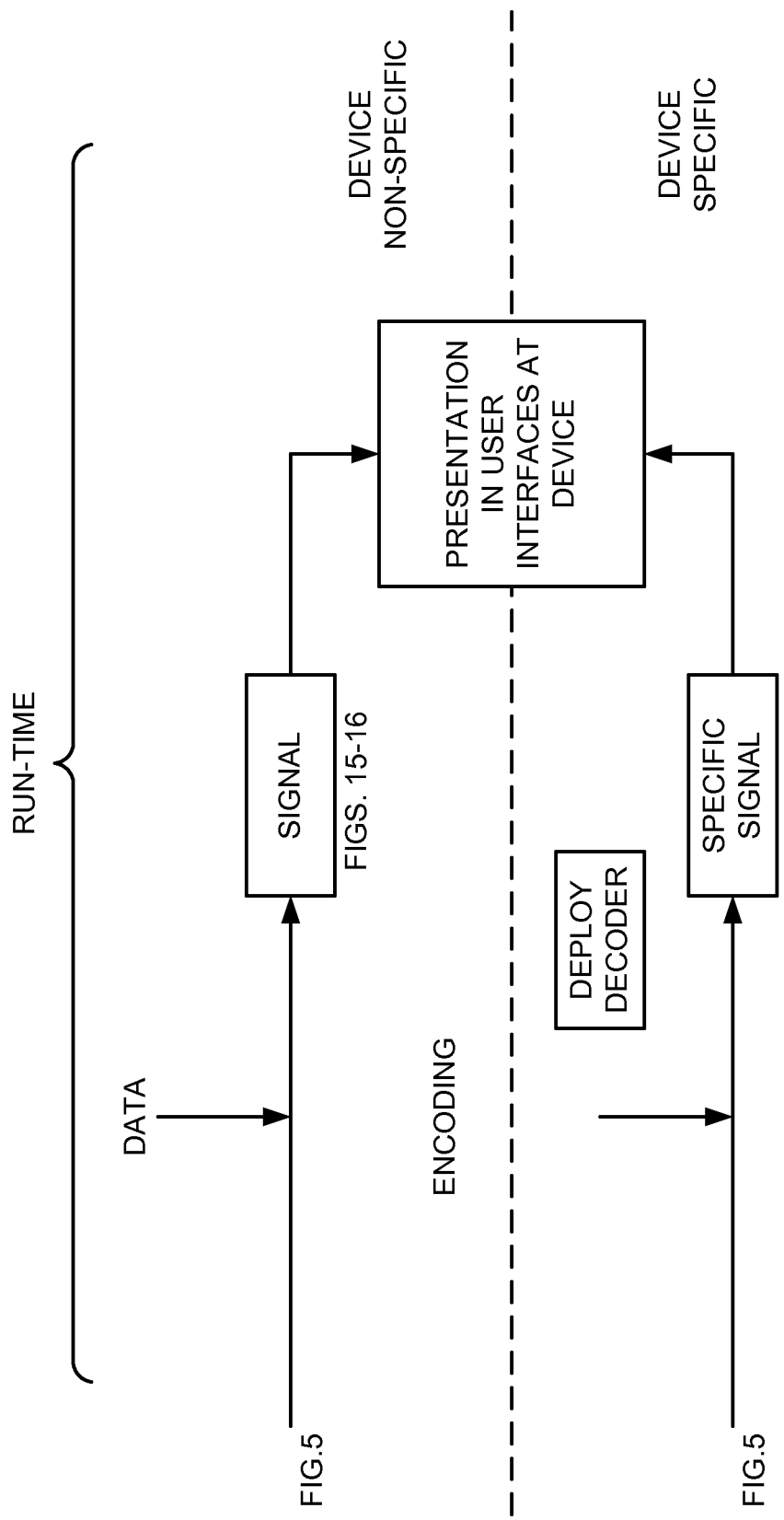

TEMPLATE 700

```
Template Generic
{
    OPERATION list of operations;
    INPORT list of inports;
    OUTPORT list of outports;
    METADATA metadata;
}
```

FIG. 7

TEMPLATE 900

```
Template Form < DataSource > extends Generic
{
public interface:
    GetData (arguments );
    GetValueHelp(arguments);
implementation:
    implementation for GetData
    { ... };
    implementation for GetValueHelp
    { ... } operations.add (GetData)
    operations.add (GetValueHelp)
}
```

FIG. 9

TEMPLATE 800

```
Template List < DataSource > extends Generic
{
public interface:
OPERATIONS:
     Sort (arguments);
     Filter (arguments);
     GetPage (arguments);
     Select (arguments);
INPORT:
     SetData (arguments)

OUTPORT:
     Selected (arguments)

implementation:
     implementation for Sort
     { ... }
     implementation for Filter
     { ... }
     implementation for GetPage
     { ... }
     implementation for Select
     { ... } operations.add (Sort)
     operations.add (Filter)
     operations.add (GetPage)
     operations.add (Select)

Inports.add (SetData)
     Outports.add (selected)
}
```

FIG. 8

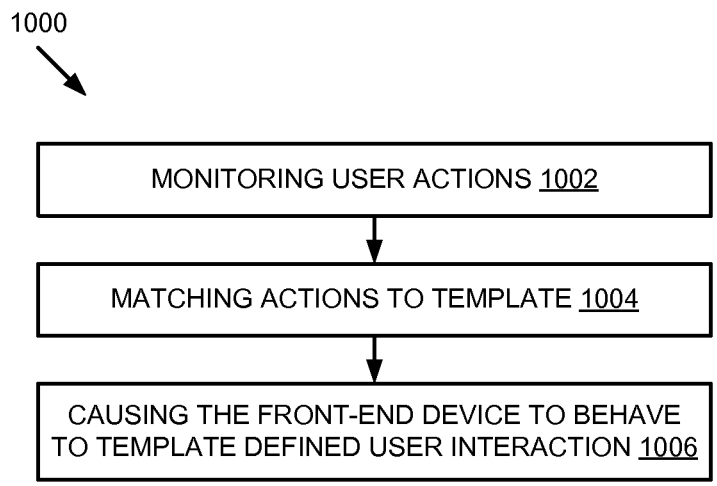

```
                     1000

┌─────────────────────────────────┐
              │  MONITORING USER ACTIONS 1002   │
              └─────────────────────────────────┘
                             │
                             ▼
              ┌─────────────────────────────────┐
              │ MATCHING ACTIONS TO TEMPLATE 1004│
              └─────────────────────────────────┘
                             │
                             ▼
              ┌─────────────────────────────────┐
              │ CAUSING THE FRONT-END DEVICE TO BEHAVE │
              │ TO TEMPLATE DEFINED USER INTERACTION 1006│
              └─────────────────────────────────┘
```

FIG. 10

CLASS 1200

```
UXObject EmployeeForm : Form < EmployeeDataType >
{
public interface:
     OPERATION AddToContacts (arguments);
     INPORT SetData (arguments);
implementation:
     implementation for AddToContacts (arguments)
     {
       invoke AddToContacts (arguments);
     } implementation for SetData (arguments)
     {
       ...
     } operations.add(AddToContacts) inports.add (SetData)
}
```

FIG. 12

```
UXApplication Employee-List-Form application(args)
{
    EmployeeList eLIST
    EmployeeForm eFORM
    EmployeeDataType data;

data.init(data);
    Connect data.DataSource to eList.SetData
    Connect eList.Selected to eForm.SetData
}
```

FIG. 14

```
<Application Name ="Employee-List-Form">
    <List Type="EmployeeList" Name="eLIST">
            <Field Name="FirstName" Type="String" .../>
            <Field Name="lastName" Type="String" .../>
            <Field Name="ID" Type="Identifier" .../>
            <Field Name="Department" Type="String" .../>
            <Field Name="eMail" Type="eMailAddress" .../>

<Record       __recordID= "04892481948478194376"
             FirstName ="Peter"
             LastName ="Green"
             eMail=peter.green@thecompany.com/>
       <Record       __recordID= " 94847037648924818194"
             FirstName ="John"
             LastName ="Red"
             eMail="john.red@thecompany.com/>
    </List>
```

FIG. 15

```
<Form Type="EmployeeForm" Name="eForm">
        <Field Name="FirstName" Type="String" .../>
        <Field Name="lastName" Type="String" .../>
        <Field Name="eMail" Type="eMailAddress" .../>
    <Operations>
        <Operation Name="AddToContacts" .../>
    </Operations>
    <Record    __recordID= "04892481948478194376"
        FirstName ="Peter"
        LastName ="Green"
        eMail=peter.green@thecompany.com/>
    </Form>
</Application>
```

FIG. 16

| | LAYER 1710 | TECHNOLOGY 1720 |
|---|---|---|
| (1) | CONSUMER UI 1712 | FRONT-END DEVICES, WITH DECODERS 1722 |
| (2) | CONSUMPTION DOMAIN FRAMEWORK UX 1714 | DESIGN-TIME TOOL; RUN-TIME; DOCUMENTS LIKE TEMPLATES, CLASSES, DATA-TYPES 1724 |
| (3) | DATA SOURCES 1716 | DATABASES, SERVICES, ENTERPRISE RESOURCE PLANNING, ETC. FOR EXAMPLE, SAP BUSINESS SUITE; BUSINESS BYDESIGN; HUMAN RESOURCES DATABASE (AS IN THE EXAMPLE) 1726 |

FIG. 17

METHOD AND SYSTEM FOR PROVIDING A USER INTERFACE IN A COMPUTER

FIELD

Embodiments of the invention are related generally to computer systems, and more particularly to user interfaces and their enabling technology.

COPYRIGHT NOTICE/PERMISSION

Portions of the disclosure of this patent document may contain material that is subject to copyright protection. The copyright owner has no objection to the reproduction by anyone of the patent document or the patent disclosure as it appears in the Patent and Trademark Office patent file or records, but otherwise reserves all copyright rights whatsoever. The copyright notice applies to all data as described below, and in the accompanying drawings hereto, as well as to any software described below: Copyright© 2008, SAP AG, All Rights Reserved.

BACKGROUND

Embodiments of the present invention relate to communicating content from data sources (e.g., management system with databases) to different frontend devices, like portable devices (e.g., notebooks, portable digital assistants PDA, mobile/cell phones), and stationary devices (e.g., desktop computers).

There are many different devices on the market, with relatively large screens (desktop or laptop computer) or small screens (PDA, phone), with different input modules (e.g., keyboard, touch-screen), with different operating systems (e.g., Windows, Linux, or device specific systems), and so on. The devices have their own way for applications or data to appear to the users in a "native" fashion or environment. For example, devices have their own branding to present data on a screen, to receive input from the user, different technology to process and render data, and so on. The interaction between the human user and the device lets the users work, purchase goods, extract information, educate or entertain themselves, and so on. Such activities are more efficient the more the users operate the device in a familiar or "native" environment.

In the state of the art today, data that is sent to the frontend device needs to be processed before sending, and is processed specifically to each frontend device. In an alternative, an application can be implemented at least partly in the frontend device so that device-specific processing is performed there. Both approaches require effort, for example, to provide device specific rules, to train a community of developers for each device according to the rules, to implement one and the same application in variants for each device, and so on. Thus, the different frontend devices and technologies cause repeating effort for development.

If pre-processing follows rules that had been originally designed for other devices, presentation and interaction may be distorted. For example, data presentation may appear strange and the user may stop looking at the data, or even worse, may choose to work, purchase and so on elsewhere.

There is an ongoing need for technology that pre-processes data independent from the devices so that the devices can present data and let the user interact with them as much as possible in a native fashion, consistently across platforms (devices and technologies).

SUMMARY

Methods and systems for providing a user interface are described. A method may include providing a template that represents data and functions for a user interaction for the user interface, wherein the user interaction is defined generically with respect to the user interface; providing an interaction-specific decoder for the computer to present the user interface with the data and functions according to the interaction; deriving a class from the template, the class defining specific parameters to add particulars of a data-type while preserving the interaction to provide a user interaction specific to the user interface; instantiating the class with data, in accordance with the particulars of the data-type; and evoking the decoder to read the instantiated class and to present the user interface according to the user interaction.

Additionally, the decoder may be provided on a first computer, and the decoder evoked on a second computer. The decoder may be deployed from a first computer to a second computer prior to instantiating the class with data.

Providing the template may include providing first and second templates for first and second interactions, and corresponding first and second decoders may be provided, wherein evoking the decoder may include presenting the user interface with first and second interactions. Deriving the class from the template may be repeated while presenting the user interface, to modify the presentation in accordance with the class. Deriving the class from the template may be repeated using earlier derived classes.

Providing the template and interaction-specific decoder may be executed by reading from a repository. The user interaction may include presenting at least one data record to a user and receiving manipulation from the user of the data record. Presenting at least one data record may be presenting metadata, where receiving manipulation from the user is manipulation of the metadata. Alternatively, manipulation may include changing the presentation, where changing the presentation may further include changing the filer or the sort. The user interaction may be to solicit input from a user of a data record into the computer.

With regard to the frontend, at runtime, a method may include receiving instructions for the processor to present data on the user interface, wherein the instructions representing basic presentation patterns defining how the data is to be presented on the user interface, and the instructions are part of the definition of the data; receiving a signal with data from a data source in combination with identifications of the instructions; matching the identifications to the instructions to generate instructions specific to a presentation environment of the user interface; and processing the instructions to present the data in the user interface corresponding to the presentation patterns. Presenting data on the user interface can be accomplished by decoder deployment. The identifications of the instructions may include, for example, SIGNAL with LIST, or FORM identifiers.

Looking then at the interaction, the instructions may include instructions to enable the user interface to interact with a user. The presentation patterns may include interaction patterns based on user input resulting from the interaction. There may be instructions to further process the data by the processor (e.g., FORM to add to address book). The presentation instructions may be derived in an enabling environment from templates, where the templates correspond to the presentation patterns. The presentation instructions may be pre-defined instructions that include pre-defined rendering schemes (e.g., instructions to present data in a list).

A computing device may include: a user interface with associated devices to present data and receive user interaction; a decoder to receive a signal including a basic presentation pattern defining how data is to be presented on the user interface in accordance with a user interaction pattern, where the presentation pattern is defined generically and not specific to the user interface, wherein the decoder is to further match the presentation pattern with parameters specific to the user interface to generate instructions for presenting data and functions on the user interface in accordance with the user interaction pattern and the presentation pattern; and a processor to process the instructions to generate a presentation specific to a presentation environment of the user interface. The generated instructions may be derived in an enabling environment from templates, where the templates correspond to the presentation pattern. The presentation pattern may include a pre-defined rendering scheme.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

FIGS. 5-6 illustrate a flow diagram of an embodiment of a process for creating signals to drive the user interfaces in the frontend devices.

FIG. 7 is a code diagram of an embodiment that uses a generic template from which basic templates (FIGS. 8-9) can be derived.

FIG. 8 is a code diagram of an embodiment that uses a template to display a list.

FIG. 9 is a code diagram of an embodiment that uses a template to display a form.

FIG. 10 is a flow diagram of an embodiment of a decoder that recognizes device-specific (native) interactions.

FIG. 12 is a code diagram of an embodiment of a class that is derived from a FORM template with the EmployeeDataType (as data type).

FIG. 14 is a code diagram of an embodiment that uses an application.

FIGS. 15-16 are code diagrams of an embodiment of the signal being sent from the encoder at runtime.

FIG. 17 is a block diagram with a layer view to repeat basic concepts.

DETAILED DESCRIPTION

Embodiments of the invention relate to user interfaces. The first figures illustrate examples of an embodiment of a frontend device that is the computer system which is most exposed to users.

Figure 1:
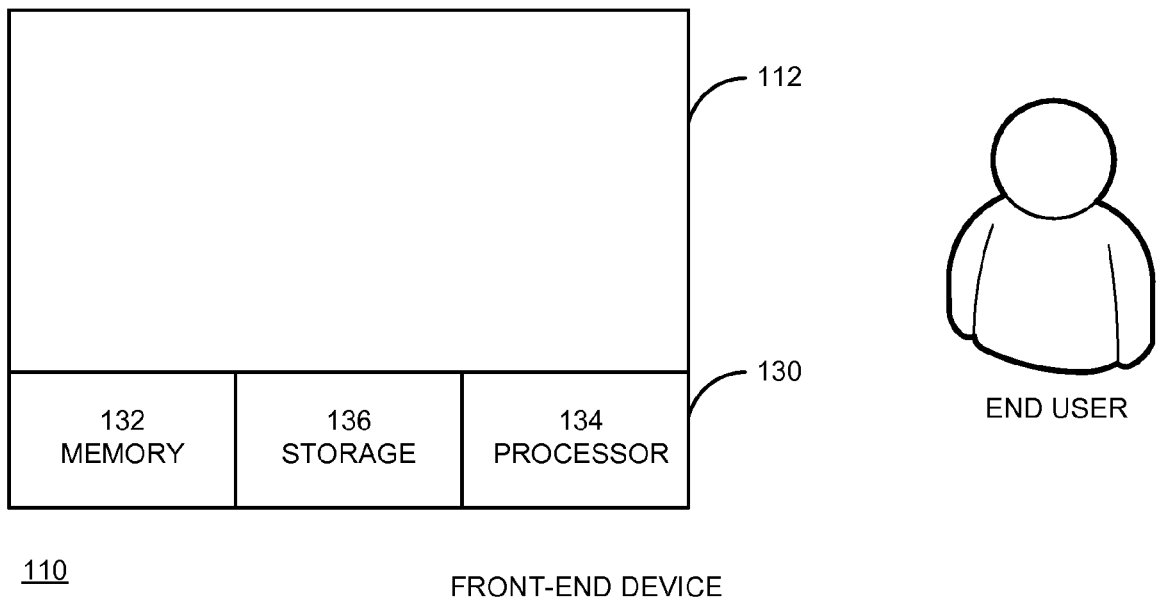
FIG. 1 is a block diagram of an embodiment of a frontend device.

FIG. 1 is a block diagram of an embodiment of a frontend device. As in FIG. 1, in one embodiment, frontend device 110 includes user interface (UI) 112, which represents any type of user interface hardware and software components, to present data to a user, and to let the user interact with the device. The combination of hardware and software components makes up the technology or environment for presentation of data. For example, components to present data can be screens (such as a liquid crystal display LCD), audio equipment (such as speakers), Braille interface, etc.; and, exemplary components for interaction are mouse, touch pad, touch screen, keyboards, microphones, etc. Thus, UI 112 can be considered a user interface system with input and output capabilities. Note that UI 112 will have certain capabilities that will change from device to device, and from technology to technology within a device. For example, the screen on a handheld device is generally smaller in form factor than that of a notebook.

Frontend device 110 includes various client resources 130 to process data and to perform work, which may include, for example, memory 132, processor 134, and storage 136. Memory 132 represents any type of memory that provides temporary storage of data and instructions. Memory 132 may include any type of random access memory (RAM), as well as read-only memory (ROM). Thus, memory 132 may be a volatile or non-volatile memory device (i.e., it may or may not lose state when power is interrupted to the memory device). Processor 134 represents one or more processors, which may be discrete devices, multi-core processors, central processing units (CPUs), microprocessors, microcontrollers, etc. Storage 136 provides non-volatile storage of data and instructions. In certain handheld devices, memory 132 and storage 136 may be the same device, or partitions of the same device.

A person operating frontend device 110 is referred to as "end-user". As mentioned, frontend devices from various manufacturers differ in terms of size (e.g., form factor of the screen), interaction principles and input gestures; but ideally the end-users (i.e. operating the frontend devices) would interact with the devices as they are used to and have access to the same data content in the native environment.

Figure 2:
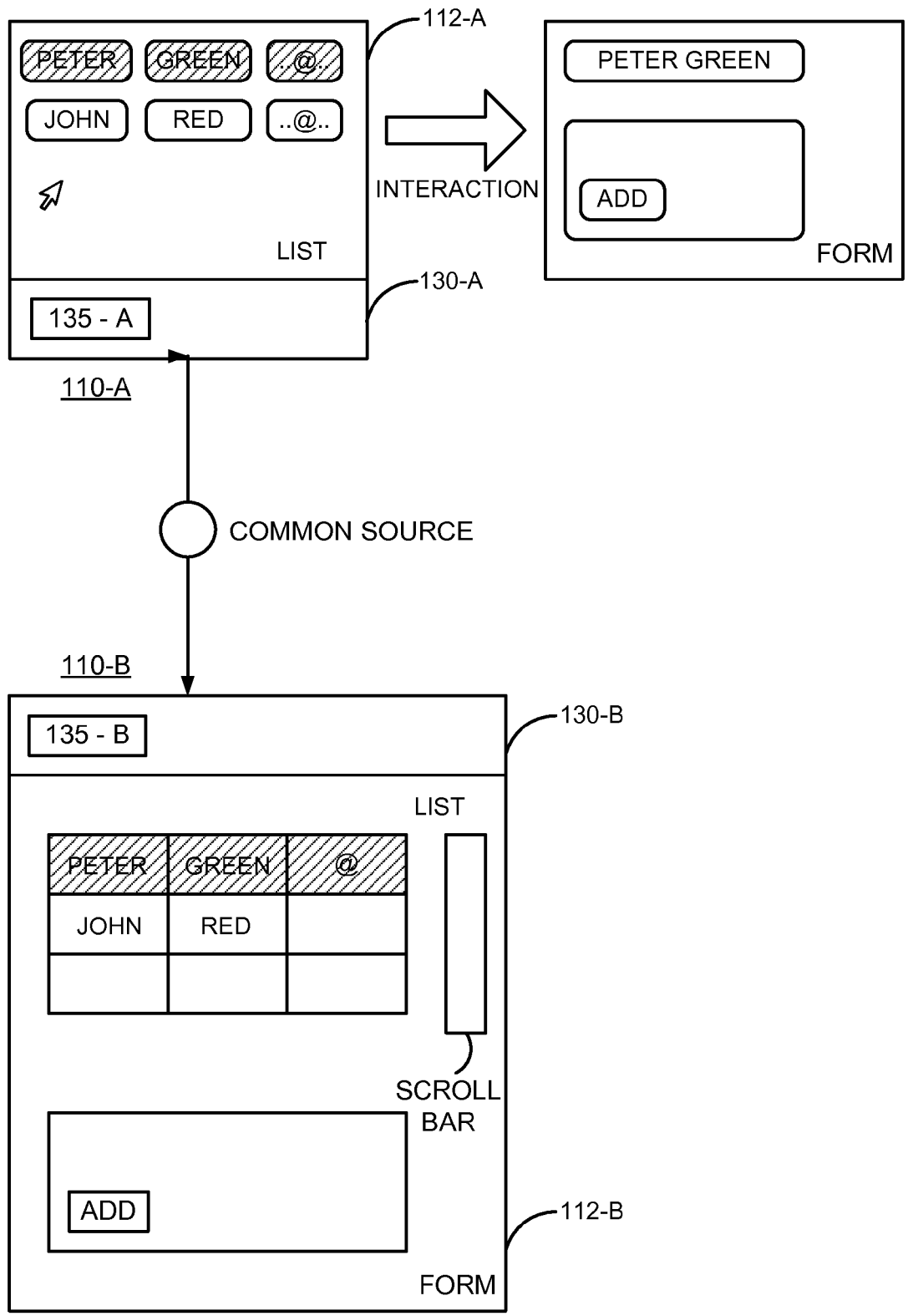
FIG. 2 is a block diagram of an embodiment with two different frontend devices.

FIG. 2 is a block diagram of an embodiment with two different frontend devices. By way of example, FIG. 2 shows exemplary devices 110-A and 110-B (in short A, B), which in an exemplary interaction model (1) present a list to the end-user with the possibility to let the end-user select an entry, and (2) following an interaction, let the end-user add the data details for the selected entry to an address book. FIG. 2 illustrates the screen of device A on left side with the list (1) and on the right side with a form (2) to let the end-user adds the selected entry to a (local) address book inside the frontend device. Device B has the list and the form located in the same screen.

In the example, device A has the native experience in its user interface 112-A, which is represented by round-cornered boxes, and to receive input (i.e., input gesture) through a mouse pointer. The native experience, different from device A, is represented by user interface 112-B presenting data with "sharp" boxes, and to receive input through scroll bar and keyboard. Native to 112-A is that the forms show up in a round box as well. End-users for A and B see the same content, but the user of A in his environment (round corners; mouse), and the use of B in her environment ("sharp" boxes; scroll bar/keyboard). The same content can be presented as described herein natively to both users in the different environments with minimal or no need to develop specifically for the different environment. Rather, the environments can become consumers of the same data.

Both devices A and B have their resources 130-A, 130-B each with a device specific component, decoder 135-A, 135-B. Decoder 135 interprets a signal from a common source and handles data presentation and user interaction in the native fashion. The signal to the decoder represents the concept of the devices as consumers of the data from the data sources. For convenience of explanation, assume that the signal has been pre-processed by an encoder that is associated with the source. Although shown by arrows going into the devices and presenting data to the end-user, it is within the scope of the invention that the decoder can also assist to receive user input (in the native fashion) and to forward this for further processing to other computers or devices.

The exemplary data shown in FIG. 2 is an employee list, with the FirstName, LastName and Email of 2 fictitious persons, Peter Green and John Red. In the example, in addition to viewing the lists, the end-user could inspect the records (or entries), and trigger actions such as selecting records (pointer at B, scroll-bar/keyboard at B) to get more details. As mentioned, FIG. 2 illustrates this for device A with the form on an extra screen (giving details for Peter Green). The form shows the name on the top and a button ADD to add him to the local address book (e.g., as a Contact). For device B, the list and form with button ADD are on the same screen. The signal for that exemplary data comes from a common source that is a computer system and a database for Human Resources Management, and is rendered and presented differently based on the native presentation environment of the devices.

Having described certain aspects of the frontend devices, the following figures illustrate enabling technology that pre-processes data independent from the devices in a backend.

Figure 3:
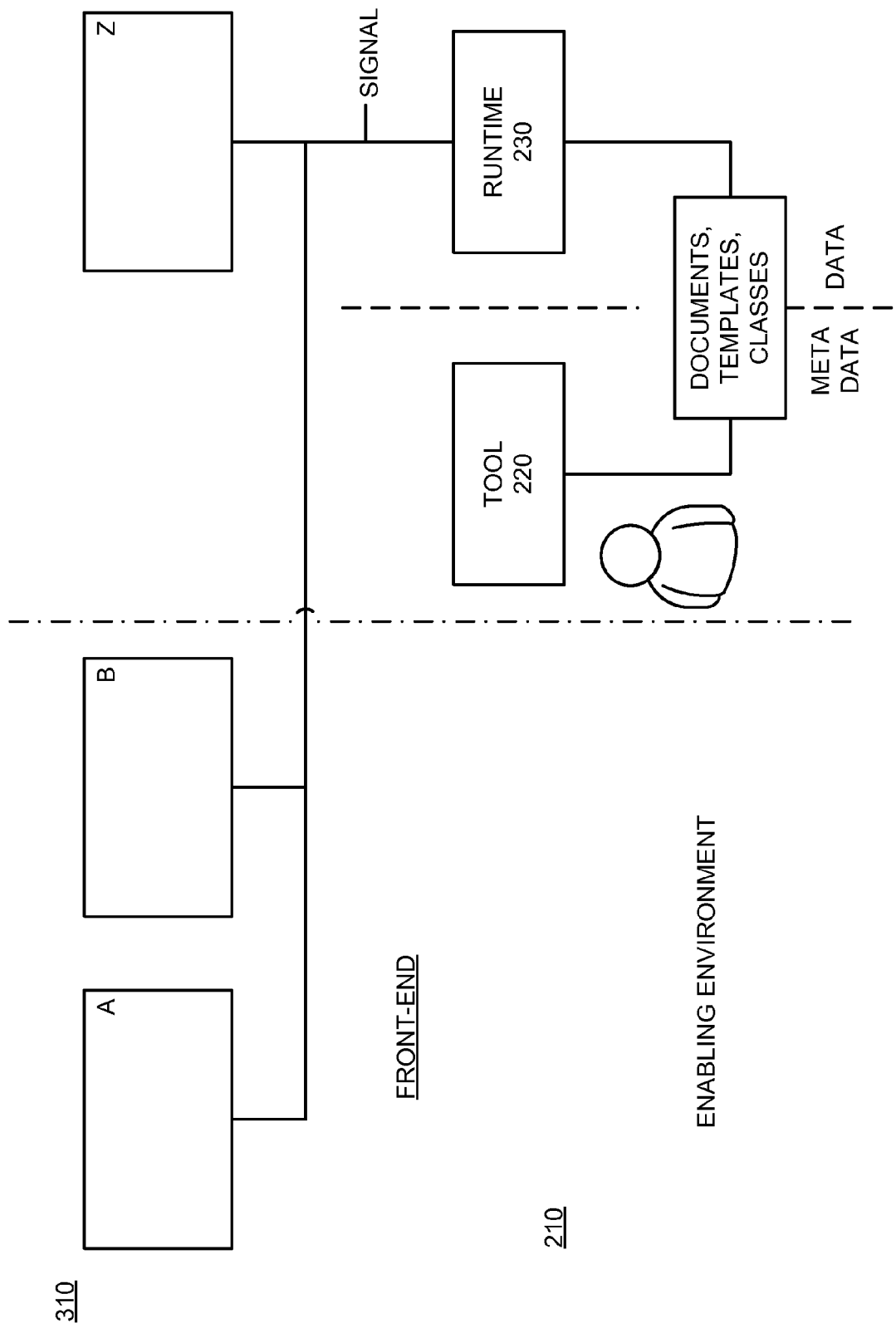
FIG. 3 is a block diagram of an embodiment with frontend devices in an environment that enables data presentation and user interaction.

FIG. 3 is a block diagram of an embodiment with frontend devices in an environment that enables data presentation and user interaction according to the present invention. Frontend devices 110-A, B, . . . Z communicate with one or more computers that are referred to herein as enabling environment 210. The enabling environment 210 is conveniently used to refer to tools (see FIG. 4), to data sources (like databases, computer systems etc.), and to resources that process templates, classes, applications.

As illustrated, a developer operates tool 220 that collectively represents components operated by the developer at various phases. During those phases, the signal is prepared but not yet sent. Tool 220 accesses documents such as templates, classes, data-type definitions, applications, etc. Reference herein to a "document" will be understood to broadly encompass a file, a collection of files, records, data blocks, etc., or other sets of data or containers that are related in at least one aspect. In the case of the documents specifically mentioned above, the documents are accessed by tool 220 to provide access to data in a native fashion within an end-user device. In one embodiment, the access is usually read-only for the templates, and read-write for other documents. The term developer is used in referring to a role rather than a specific individual, and different persons can take the role.

Runtime 230 collectively represents components that are active at runtime. Components include software programs, containers, loaded data, hardware drivers, etc., which is loaded in memory to provide an execution environment for the processor of a host computer system. In the example, runtime is at the time when the signals or data from data sources are sent to and from the device. Runtime 230 can communicate with the mentioned databases and computer systems (sources), etc., and can access at least some of the templates and classes.

The dashed line between tools/documents and runtime 230 illustrates that only some components are needed at different phases. The dashed line also indicates separation between placeholders for metadata (left side) and normal data (right side). Thus, the exemplary persons Peter Green/John Red are known on the runtime side only (right)—they are unknown (as specifics) to the developer (left), and are only represented generally during development.

Persons of skill in the art understand that enabling environment 210 is implemented by computers with processors, memory, storage, etc. The functions, especially those of the tool, runtime and access to template/classes documents can be distributed to one or more computers. In FIG. 3, a distribution is indicated by the dashed-point line: frontend devices A and B run on computers that are separated from the computers of the enabling environment, while device Z could be implemented by a computer running both the frontend and the enabling environment.

The following explanation provides descriptions with reference to the developer by looking at an exemplary tool, and then focuses on the documents and explains aspects of the runtime.

Figure 4:
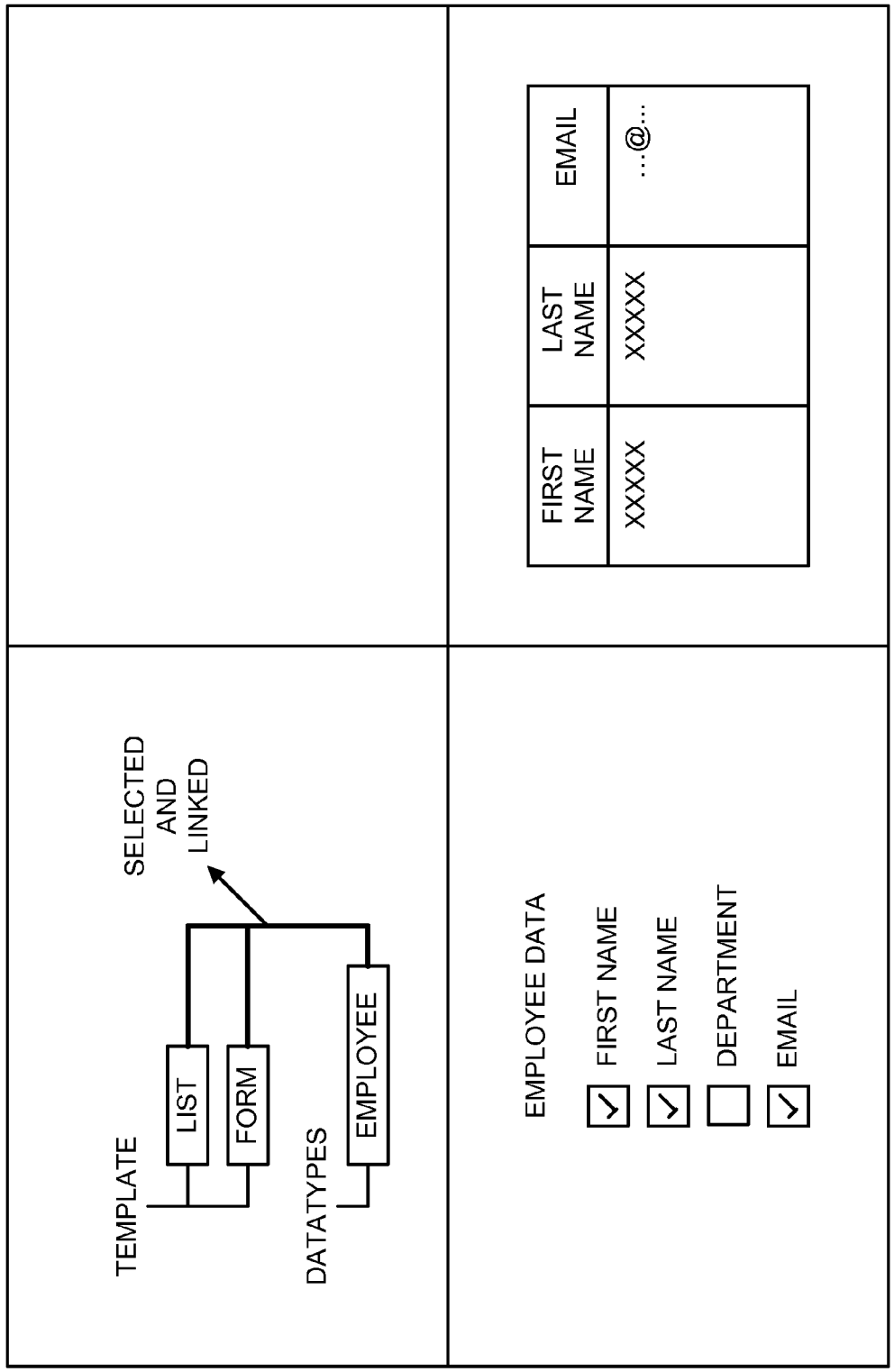
FIG. 4 is a block diagram of an embodiment of a tool.

FIG. 4 is a block diagram of an embodiment of the tool. In the example that is used here for illustration, the developer has the goals to define a user interface for the end-user with (i) a list of employees, and (ii) the possibility for the end-user to add details for a particular employee to an address book, as explained in connection with FIG. 2. The tool has a choice area (illustrated on the left side) and a pre-view area (illustrated on the right side).

To accommodate goal (i), as illustrated in one embodiment, the developer has chosen a basic template LIST and a data-type EMPLOYEE-DATA. Since the exemplary data-type indicates available fields for "employee" such as FirstName, LastName, Department and Email, the developer can choose each field individually. In the example of FIG. 4, the developer has chosen FirstName, LastName, and Email, but not Department. According to the choice, the tool presents a list in a generic fashion, which would be generic to all devices that would receive a signal sending the data (e.g., there is no round-shape or the like of device A). Thus, there is no need for the developer to know the details for the frontend devices, and the device-specific details and the consumption of the data signal by the frontend devices is separately developed. The development for each individual frontend can be much quicker because the same data is accessed from the data source. Note that the records are given as 'xxx', indicating as mentioned above that actual names may not be visible here, because the tool ignores actual content (e.g., details of Peter Green/John Red are considered highly confidential). To accommodate goal (ii), the developer can choose the basic template FORM and the data-type EMPLOYEE-DATA. The developer can then take the FORM template and link the already chosen LIST/EMPLOYEE to it.

In one embodiment, content is separated from the form. Thus, the developer looks at very general content (e.g., the names of fields that could be displayed) but does not need to look at potential visualizations. The developer may not see different display type of devices A or B, nor of device Z which is potentially not yet available on the market. The data is developed for later consumption and need not contain any device-specific information. The tool could be implemented as a plug-in to an existing Integrated Development Environment (IDE) (of which many are commercially available, such as Eclipse or Visual Studio).

Although FIG. 4 shows the tool with check-boxes, information from templates and data-source definitions can be enhanced by operations. For example, if the form should indicate the age of the employee, and the age is not available in a data-source, the developer could program a rule to derive the age from available data. For example, the current date (i.e., at runtime) minus the date of birth (from a data-source) can be used to derive age. The possibility to add operations (instead of simple data) could be linked to an allowance indicator in a generic template.

To summarize, the tool such as illustrated in FIG. 4 could help the developer to create a specification for presenting data and defining user interaction without the need of writing code. The tool accesses documents (templates, classes, etc.) "in the background", and there is no need to let the developer change the documents by changing code. The explanation below provides descriptions more specific to the documents.

Figure 5:
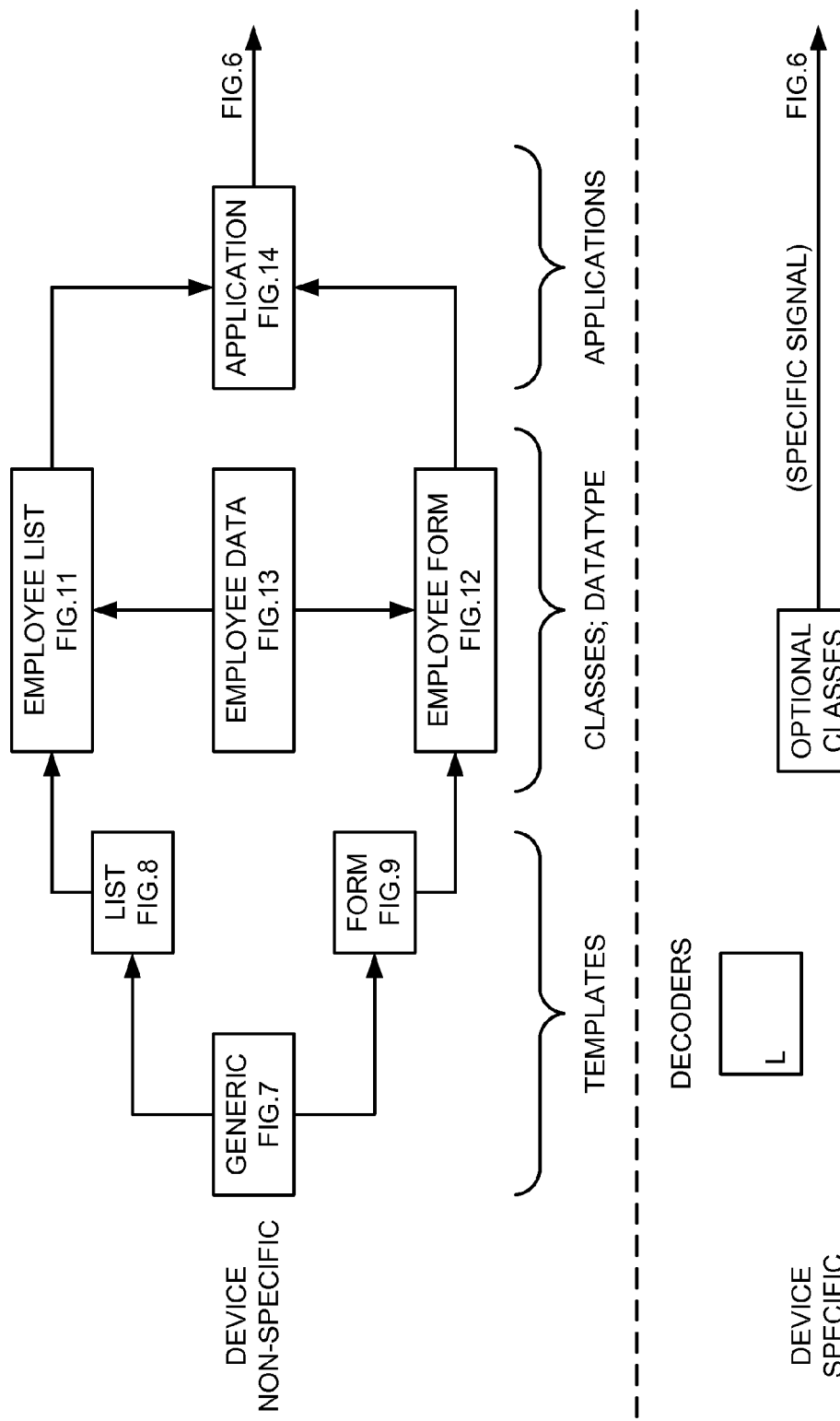

FIGS. 5-6 illustrate a flow diagram of an embodiment of a process for creating signals to drive the user-interfaces in the frontend devices. FIG. 6 is just the continuation of FIG. 5. The figure illustrates templates, classes, data definitions, etc., in boxes, and indicates the time progressing from left to right. The time can conveniently be classified into design-time (template, specialization, decoder deployment phases, cf. FIG. 5) and runtime (cf. FIG. 6). As indicated by a dashed line (drawn horizontally), there are elements that are device non-specific (above the line: templates, classes, datatypes, application, data, interface signal) and device specific elements (below the line: device-specific signal, decoders, and decoders deployed to the frontend device).

The following is a short overview of different phases, where reference to the Figures indicates one possible example: (a) Optionally, providing a generic template (in a template phase)—see details in FIG. 7; (b) Providing templates (in the template phase). In the example, basic templates LIST and FORM (details in FIGS. 8-9) are derived from a generic template; (c) Providing decoders (in the template phase), or decoder modules, specific for each frontend device. The decoder modules correspond to the basic templates; in the example there are decoders to display lists (L) and forms (F). The decoders are provided after completing the basic templates. Decoder details are explained in connection with FIG. 10; (d) Deriving classes and connecting the classes to data-type definitions (in the specialization phase). In the example, the template LIST (FIG. 8) is connected to the data-type EMPLOYEE-DATA (FIG. 13) to obtain the class EMPLOYEE LIST (FIG. 11); and the template FORM (FIG. 9) is connected with EMPLOYEE-DATA to the class EMPLOYEE-FORM (FIG. 12), by specialist developers (cf. the FIG. 4); (e) Combining the classes into an application. Since in the example (cf. FIG. 2), the user interface will be (i) a list of employees, and (ii) the possibility for the end-user to see details for a particular employee in a form, the application is conveniently referred to as "EMPLOYEE-LIST-FORM-APPLICATION" (FIG. 14); (f) Deploying the decoders to the frontend (decoder deployment phase, prior to or during runtime, cf. FIG. 6); (g) Adding runtime data into the response (runtime) by encoding application and data into the signal (FIGS. 15-16). This is called user interface signal in the example, which refers to accessing the data-source to add actual names (Peter Green, John Red). Thus, the process instantiates the classes (or applications) by data. Note that runtime data is added in the device non-specific world (above the line); and, (h) Presenting and interacting with the end-user (runtime). In the example, this is the presentation of data and user interaction already described in connection with FIG. 2.

The signal as illustrated above the dashed line is device non-specific. Optionally, device specific classes could be used to provide device-specific signals (below the dashed line).

Details are explained in the following in connection with certain figures. Some of the figures are code diagrams. The code syntax has been selected for best understanding and convenience of explanation but is an example only, and is not limiting. A person of skill in the art can implement the code differently without departing from the scope of the invention. Further, some code is labeled with terms that use the acronym "UX" standing for "user experience", as in the labels "UXObjects" or "UX applications". The labels are merely examples, and persons of skill in the art can identify the code otherwise. The term "arguments" collectively stands for one or more arguments that the person of skill in the art uses in function calls and the like.

FIG. 7 is a code diagram of an embodiment which uses a generic template from which basic templates (FIGS. 8-9) can be derived. Template 700 illustrates a generic template. OPERATION indicates that the further templates are allowed to define operations. In one embodiment, generic template 700 generally does not define operations. As in the example, a further template might expose operations beyond the generic functions such as sort, filter, etc. These operations including potential parameters can be accessed through the template and can be provided by the specialization of the template, e.g., ListOfEmployee.

Potential connections to and from other templates and to and from data-sources are given in the example by INPORT and OUTPORT. The ports can be seen as triggers that initialize some processing in the template. The basic templates (e.g., template 700) might expose as many in- and outports (short for input/output port) as needed. In one embodiment, outports can be seen as events that signal some state change in the template.

As illustrated in the example by METADATA metadata, the template provides metadata about itself and about its data source. Exemplary metadata is the number of fields in a record, the type of a field (integer, string, etc.), details for operations (e.g., access restrictions, data read/write permissions), and so on.

FIG. 8 is a code diagram of an embodiment that uses a template to display a list. Template 800 can be used at runtime for tabular display of a list of homogenous records to the frontend device. The exemplary code line "public interface" indicates that the functions are to be handed over to the classes without restrictions. The exemplary interactions may include that (1) the end-user should be able to sort records (of the list that is displayed), (2) the end-user should be able to filter records, (3) the end-user should be able to go from page to page of a long list, and (4) the end-user should be able to select any records.

Template 800 illustrates a "LIST" template, which is an exemplary template for a basic interaction to present a list on a user interface. Lists can be used to present pluralities of records, for example, a list can show the records as lines on a display. The LIST template does not require the user interface to show a list on a screen—for example, presenting the records otherwise (e.g., in audible form) is also possible. In one embodiment, LIST is an example for read-only data access, and may provide an example for operations by the end-user. In the particular example with goal (i) as mentioned above, the operation that will be used in the application is operation (4) Select.

FIG. 9 is a code diagram of an embodiment that uses a template to display a form. Template 900 illustrates an example template "FORM," which is a template for the basic interaction to access details for a selected record. FORM is an example for read-write data access. Template Form provides an example of a simple form template used for the display of a single record. For example, there is a function defined to get the values for a record and to add the records to an address book. In the example, this enables implementing goal (ii).

FIG. 10 is a flow diagram of an embodiment of a decoder that recognizes device-specific (native) interactions. The decoder (cf. 135 in FIG. 2) monitors user interactions, 1002, and recognizes user input (from the end use, frontend device 110). The decoder triggers the frontend device to function accordingly. Thus, the decoder matches user action to the template, 1004. For example, the decoder in device 110-A has a portion that corresponds to the LIST template, since the device interacts with the end-user through the mouse pointer (cf. FIG. 2), the decoder recognizes the end-user's mouse pointer actions as, for example, corresponding to the Select operation (cf. FIG. 8). Matching the corresponding action to the end-user's actions, the system causes the frontend device to communicate an identification of the selected record to the enabling environment, 1006. Similarly, the decoder corresponding to the LIST template in device 110-B recognizes scroll-bar/keyboard actions in device 110-B as the Select operation.

Figure 11:
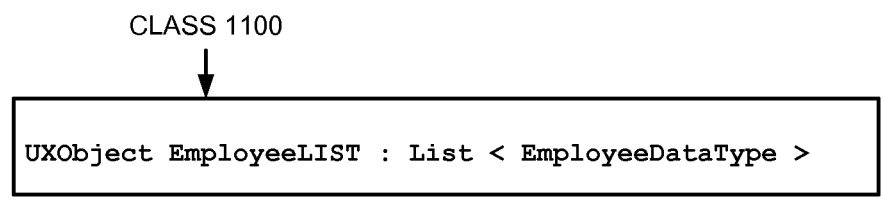
FIG. 11 is a code diagram of an embodiment of a class that is derived from a LIST template with the EmployeeDataType (as data type).

FIG. 11 is a code diagram of an embodiment of a class that is derived from the LIST template with the Employee-DataType (as data type). As mentioned, "UXObject" is simply a label. UXObject represents class 1100 from which UX objects can be instantiated. The class itself is derived from a template, as mentioned above.

FIG. 12 is a code diagram of an embodiment of a class that is derived from the FORM template with the Employee-DataType (as data type). As mentioned, "UXObject" is simply a label. In the particular example of class 1200, goal (ii) can be accommodated by the functions AddToContact. Persons of skill in the art are able to provide the implementation for such operations based on what is shown in the figure and otherwise described herein, without the need of further explanation.

Figure 13:
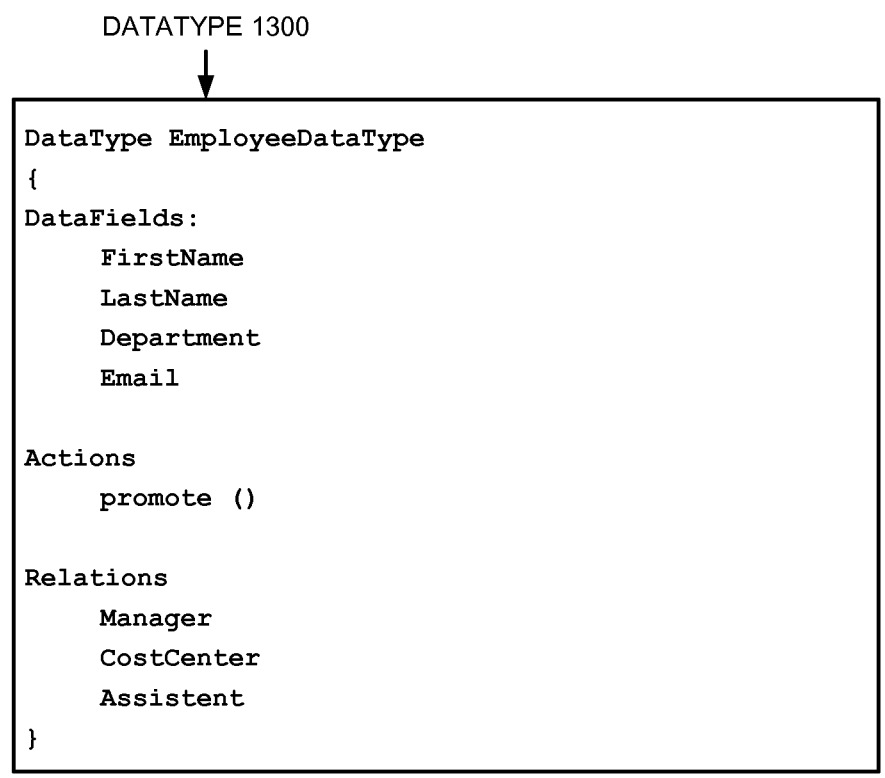
FIG. 13 is a code diagram of an embodiment of a DataType for EMPLOYEE-DATA.

FIG. 13 is a code diagram of an embodiment of a DataType for EMPLOYEE-DATA. In the example, datatype 1300 indicates that very basic data is available. See also FIG. 4 where the tool indicates FirstName, LastName, Department and Email as available for being chosen. In the example, the data type indicates that actions are possible, such as to promote an employee. The data type also indicates that data for a particular employee can be available in relations to other employees (manager, assistant) or to fiscal data (cost center). In the example, the actions and relations may not be used with goals (i) and (ii), described above.

FIG. 14 is a code diagram of an embodiment that uses an application. At runtime, the applications provide connections between various data input/output ports. EmployeeLIST and EmployeeFORM are exemplary classes, and eLIST and eFORM are objects (i.e., instantiations of the classes). Code to define which classes will be available in the application include, for example, EmployeeList (here: eList, objects.add (eList)). A helper object that allows creating a query out of the arguments includes, for example, data.init( ). To create a data-flow connection between outports and inports (cf. the generic template in FIG. 7), the "Connect" statements are used.

Moving further in time within the flow of FIGS. 5 and 6 equipping frontend devices with decoders, the decoders are specific for each device. For example a decoder for device A is adapted to render a user interface based on the LIST template as a list, with the native presentation (in the example the round-shapes) and native interaction (i.e., reading mouse). The decoder for device B is adapted to the LIST template as a list, but with the presentation and user interaction that is native to B.

In one embodiment, it is sufficient to install the decoders just prior to presenting, while advance distribution may provide increased convenience and/or efficiency. Automatic deployment of decoders upon communicating at runtime would be possible as well. In one embodiment, there are decoders with modules that are specific for each available template, for example, a module to decode LIST, to decode FORM, etc. Manufacturers of frontend devices often sell the devices in an infrastructure with deployment channels, for example, mobile phones use the phone communication network to receive firmware/software updates.

In one embodiment, installing the decoders is a one time action that need not be repeated with every data exchange between frontend and backend. It is convenient to install decoders in the non-volatile memory (e.g., hard disk, flash memory) of the device, but would also be possible to just to keep the decoder in the working (RAM) memory (e.g., a just in time deployment).

FIGS. 15-16 are code diagrams of an embodiment of the signal being sent from the encoder at runtime. As in the example, the signal may be sent to the frontend device. The signal corresponds to the exemplary scenario of FIG. 2. As illustrated in FIG. 15, the enabling environment has sent the list with two employees (Peter Green, John Red) to the frontend device. The signal indicates that the template LIST is used, so that the corresponding decoder (cf. 135 in FIG. 2) is activated. The end-user has selected the exemplary employee Peter Green for details, or for a detailed view. The frontend device has returned an identification of this selection to the enabling environment, which repeats the signal. Specifically with regard to FIG. 16, the signal is repeated in a FORM. In the particular example, the operation defined in FORM is to add the selected employee as a contact in the local address book. Having illustrated the signal in two versions that are submitted consecutively (FIGS. 15 and 16), is convenient for explanation. For frontend devices of different enabling technology, cf. device B—where as in the example both LIST/goal (i) and FORM/goal (ii) are given in the same screen, the signal could be combined and sent substantially simultaneously.

FIG. 17 is a block diagram with a layer view to repeat basic concepts of the invention. More generally, concepts of the invention can be explained in connection with a layer model, where embodiments of the invention are in the top layers. Specifically with reference to FIG. 17, layer 1710 includes layers consumer UI 1712 (layer 1712), consumption domain framework UX layer 1714 (layer 1714), and data sources 1716 (layer 1716). The following overview table maps the layer concept to technology that has been explained above. Each layer 1710 has an associated technology 1720. Technology 1722 corresponds to layer 1712, and includes frontend device(s), with decoders. Technology 1724 corresponds to layer 1714, and includes design-time tool(s), runtime, and documents like templates, classes, and data types. Technology 1726 corresponds to layer 1716, and includes databases, service, enterprise resource planning (ERP), etc., such as SAP Business Suite, Business ByDesign, and Human Resources Database.

In one embodiment, the interactions between layers 1712 and 1714 are standardized, as explained in connection with the SIGNAL that is not specific for the frontend device. Hence, additional devices in layer 1712 (e.g., later-developed/released devices that later appear on the market) can be turned into "consumers" by simply providing the device-specific decoders. Specifically, no change to the data or backend need be made to implement on a new device that is customized with such a decoder or active business client. Additional templates in layer 1714 only require additional decoders to be deployed. Provided the processor power of the frontend device is sufficient (e.g., in case of desktop computers), some or all of the functions in the framework layer 1714 can be implemented by the frontend device (cf. FIG. 3 device Z with frontend and enabling environment in one device).

The following figures illustrate a re-use scenario. In the example, the user interface should show two forms, with two different employees to compare. Because the developer has already established a connection between the FORM template and the DataType EMPLOYEE-DATA (resulting in the EMPLOYEE-FORM class), the developer could use the existing class to define a user interface for two persons.

Figure 18:
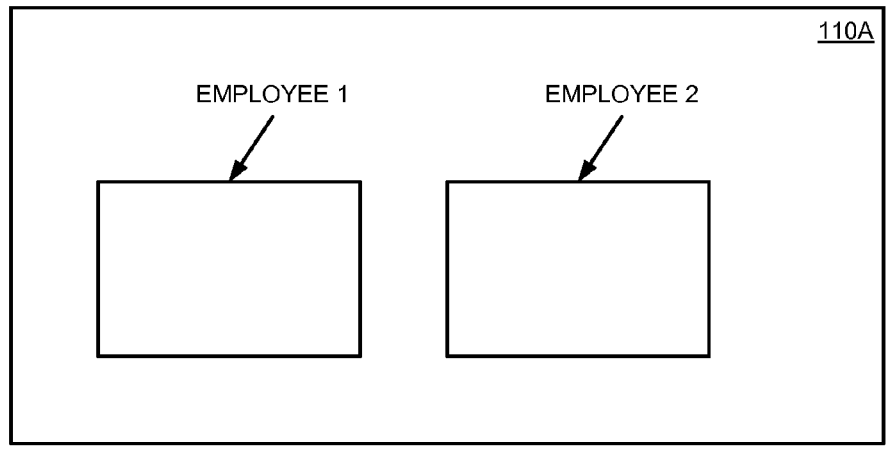
FIG. 18 is a block diagram of an embodiment of a simplified user interface (e.g., device A, 110-A) presenting 2 forms.

FIG. 18 is a block diagram of an embodiment of a simplified user interface (e.g., device A, 110-A) presenting two forms, represented by the two employees, employee 1 and employee 2, and specific to the two employees.

Figure 19:
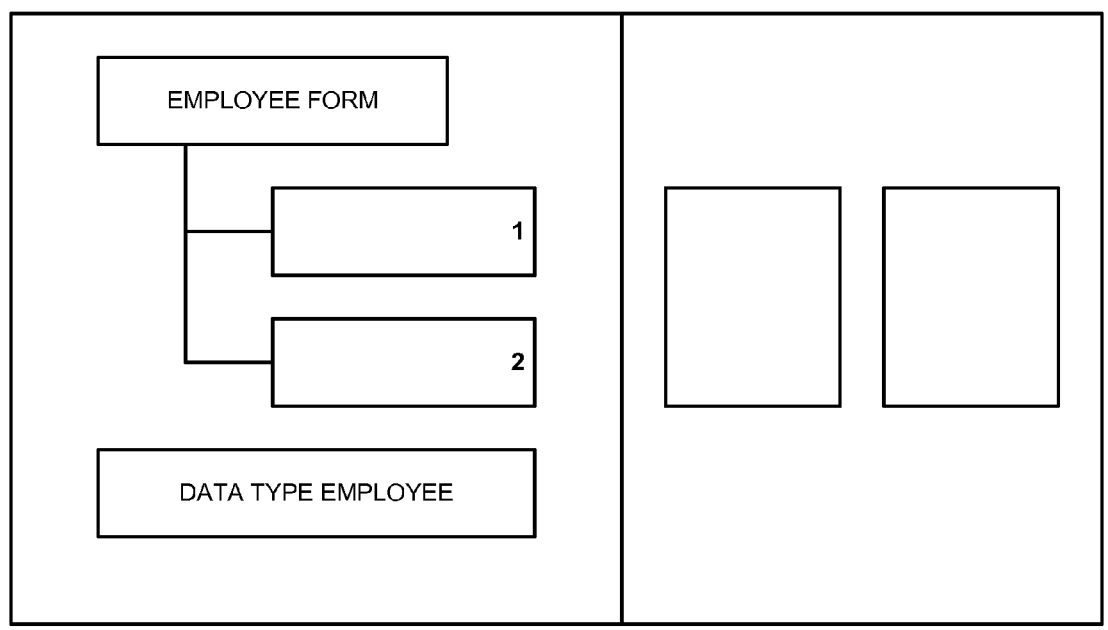
FIG. 19 is a block diagram of an embodiment of a tool.

FIG. 19 is a block diagram of an embodiment of the tool. The developer selects an existing EmployeeForm class with the DataType Employee and indicates that two different forms are to be presented. The selected forms can then be presented in the UI. In the preview area (the right side), the two forms can be evaluated as they would be presented to an end-user in the UI.

Figure 20:
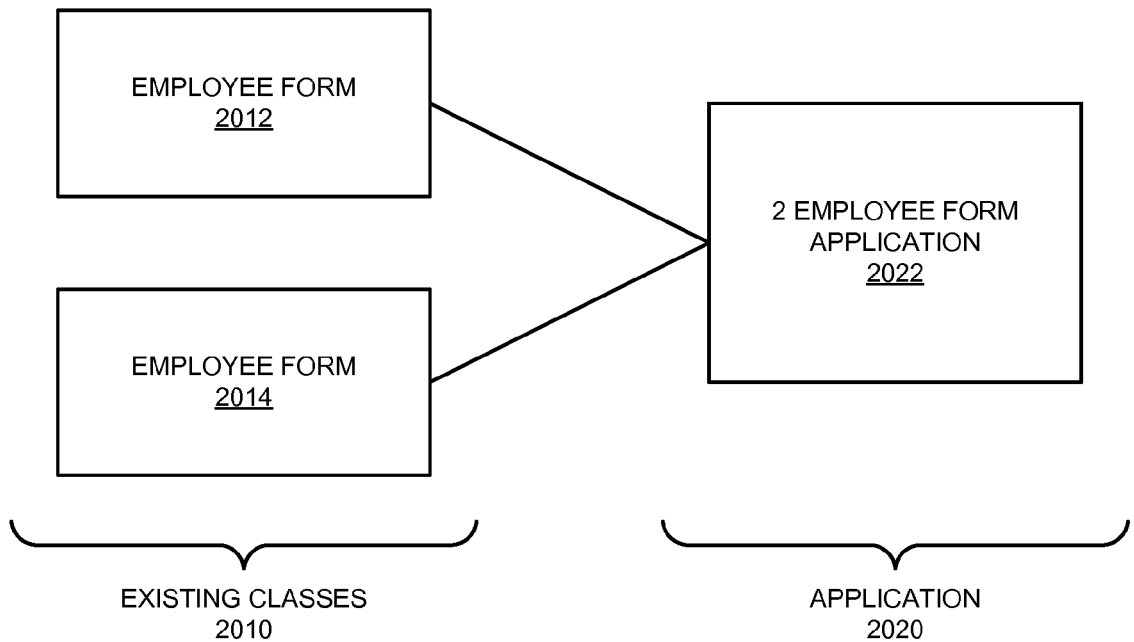
FIG. 20 is a flow diagram of an embodiment where two classes are re-used for an application.

FIG. 20 is a flow diagram of an embodiment where two classes are re-used for an application. Note that classes (employee forms 2012 and 2014 of existing classes 2010) are re-used and do not have to be derived from the templates. As mentioned above, the signal to/from the frontend device is the same for different devices. Thus, the classes may be rendered in application level 2020 as a two-employee form application 2022.

Figure 21A:
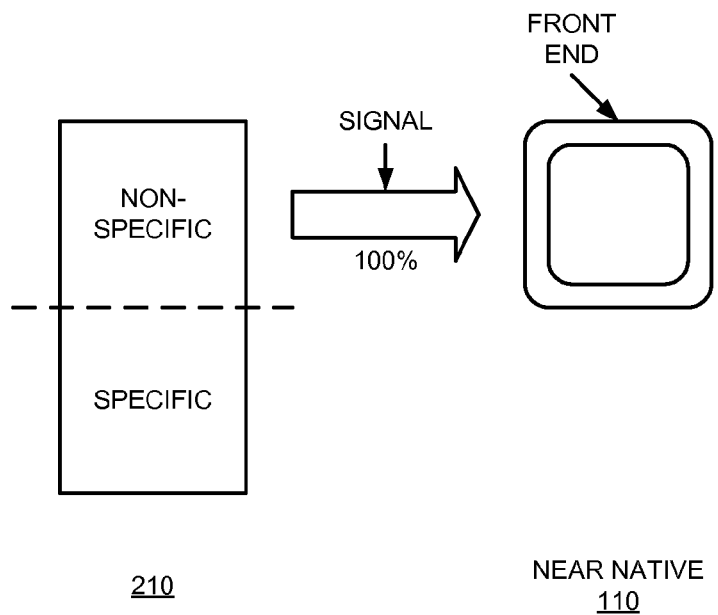
FIGS. 21A-21C illustrate some aspects of a signal sent to an application.
Figure 21B:
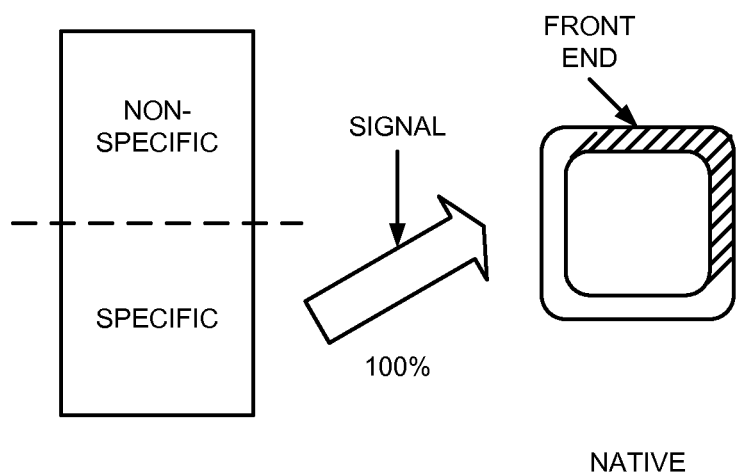
Figure 21C:
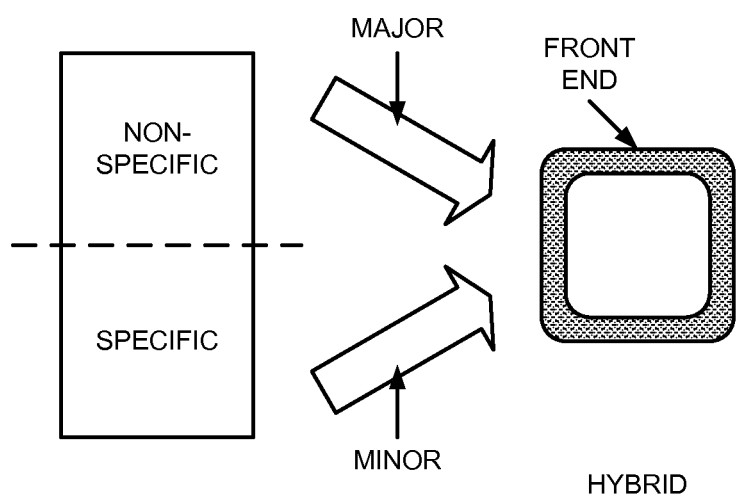

The following is a discussion about aspects of mixing device-independent signals and device-specific signals. FIGS. 21A-21C illustrate aspects of the signal. Similar to what is illustrated in FIG. 6, the signal is shown above the dashed line (non-specific to the device), with the option to have a further signal device-specific. Similar to FIG. 3, there is an enabling environment 210 sending the signal to the frontend device 110. Multiple possible approaches are possible, certain of which are illustrated as follows.

The approach of FIG. 21A uses a pure device-independent signal. Due to the usage of decoders as explained in connection with embodiments of the inventions, the approach is effective with respect to pre-processing and providing technical support because only a single type of signal is used for different devices. As indicated by the round-edged boxes, the frontend shows a "near native" experience to the end-user.

The approach of FIG. 21B uses individual device-specific signals, at the price of being less efficient, but with more options to fine-tune the native display. As illustrated with the round-edged boxes and with extra lines at a 45-degree angle, the frontend device shows a "native experience." Compared to the approach FIG. 21A, the extra lines stand for the piece of user experience that makes the UI native.

The approach of FIG. 21C illustrates a hybrid-approach, using the device independent signal for most of the communication, and using device-specific signal components to deal with the remaining native display/rendering aspects for which providing templates and decoders are not yet available (or not justified to set them up).

In one embodiment, aspects of the invention can be summarized by a method providing a user interface to a frontend device, comprising: providing templates that represent recurring user interactions; providing decoders for providing presentation in the frontend device according to the user interactions, deriving objects from the templates, the object being specializations that add particulars of data-types while keeping the user interactions; combining the objects into an application to accommodate multiple user interactions; deploying the decoders to the frontend device; instantiating the application (through the templates/objects) with data, in accordance with the particulars of the data-types; forwarding the instantiated application to the frontend device; and operating the decoders to present the user interface according to the instantiated application.

Various operations or functions are described herein, which may be described or defined as software code, instructions, configuration, and/or data. The content may be directly executable ("object" or "executable" form), source code, or difference code ("delta" or "patch" code). The software content of the embodiments described herein may be provided via an article of manufacture with the content stored thereon, or via a method of operating a communication interface to send data via the communication interface. A machine or computer readable storage medium may cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein may be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A method at a development environment for providing a user interface in a first frontend computer, the method comprising:

providing at the development environment a template that represents data and user interaction functions for a native environment for the user interface in the first frontend computer, wherein the native environment includes hardware and software components that make up interface technology supported by the first frontend computer, and wherein the native environment is defined generically in the template with respect to the user interface, the generic definition including types of user interaction functions defined generically for interfaces of a plurality of frontend devices including the first frontend computer, the plurality of frontend devices having different respective interface technology and different respective native environments;

for each of the plurality of frontend devices:
generating based on the template a different respective environment-specific decoder corresponding to the interface technology of the frontend device; and
issuing the respective environment-specific decoder from the development environment, wherein the frontend device to receive and execute the respective environment-specific decoder to present the user interface with specific data and user interaction functions according to the native environment of the frontend device based on user interaction with the user interface technology supported by the frontend device;

deriving a class from the template, the class defining specific parameters to add particulars of a data-type while preserving the native environment to provide an environment specific to the user interface based on the hardware and software components supported by each different device, wherein the generating the different respective environment-specific decoders for each of the plurality of frontend devices based on the template is independent of the deriving of the class from the template;

wherein a backend device instantiates the class with data, in accordance with the particulars of the data-type according to the user interaction type of the native environment, the instantiated class defining the specific data for the user interaction, wherein the decoder is deployed to the first frontend computer prior to the backend device instantiating the class with data; and wherein the first frontend computer evokes the respective environment-specific decoder to read the instantiated class from the backend device and to present the user interface with the user interaction functions according to the native environment of the first frontend computer, including matching user interaction native to the hardware and software components of the user interface of the first frontend computer to data and interface functions defined by the template.

2. The method according to claim 1, wherein the development environment derives a first class from a first template and a second class from a second template;

wherein, independent of derivation of the first class from the first template, the development environment generates based on the first template a first environment-specific decoder corresponding to a first user interaction function for interaction with the user interface;

wherein, independent of derivation of the second class from the second template, the development environment generates based on the second template a second environment-specific decoder corresponding to a second user interaction function for interaction with the user interface;

wherein the backend device executes an application to instantiate the first class with first data and to instantiate the second class with second data wherein the first frontend computer receives the first environment-specific decoder and the second environment-specific decoder from the development environment, and executes both the first environment-specific decoder and the second environment-specific decoder to access the application for interaction with the user interface in the native environment of the first frontend computer.

3. The method according to claim 1, wherein in the step providing the template, first and second templates for first and second native environments are provided, each having different hardware and software components that make up supported interface technology, in the step providing the decoder, first and second decoders are provided, and in the step evoking, the user interface is presented with first and second environments.

4. The method according to claim 1, wherein the step deriving the class from the template is repeated while presenting the user interface, to modify the presentation in accordance with the class.

5. The method according to claim 1, wherein the step deriving the class from the template is repeated using the earlier derived classes.

6. The method according to claim 1, wherein providing the template and different respective environment-specific decoders is executed by reading from a repository.

7. The method according to claim 1, further comprising presenting at least one data record from the backend device to the first frontend computer and receiving manipulation from a user of the data record, the manipulation of the data record altering a presentation of the user interface.

8. The method according to claim 7, wherein presenting the data record comprises presenting metadata and receiving manipulation of the metadata.

9. The method according to claim 7, wherein changing the presentation comprises changing a filter or sort of the data.

10. The method according to claim 1, further comprising soliciting from the user the input of a data record into the first frontend computer.

11. A method at a frontend computer device for presenting data on a user interface that is coupled to a processor of the frontend computer device, the method comprising:
receiving instructions for the processor to present data on the user interface, the instructions representing basic presentation patterns defining how the data is to be presented on the user interface and how different types of user interaction functions are to be interpreted in accordance with a native presentation of the user interface of the frontend computer device, the instructions being part of the definition of the data, the instructions being derived as an instantiation of a class by a backend device coupled to the frontend device, wherein the class is based on a template that generically defines a specific interaction circumstance of the native presentation environment of display hardware and software components associated with the user interface based on user interaction with the user interface;
receiving a signal with data from a data source in combination with identifications of the instructions;
receiving an environment-specific decoder generated based on the template independent of the class and sent to the frontend computer device, wherein the environment-specific decoder is deployed to the frontend computer device prior to the instantiation of the class by the backend device; and executing the environment-specific decoder at the frontend computer device to read the derived instructions of the class to match the identifications to the instructions to generate instructions specific to the native presentation environment of the user interface based on the supported display hardware and software components, including matching user interaction native to the hardware and software components of the user interface to data and different types of user interaction functions defined by the template; and processing the instructions to present the data and user interaction functions in the user interface corresponding to the presentation patterns.

12. The method for presenting data of claim 11, wherein the instructions include instructions to further process the data by the processor.

13. The method for presenting data of claim 11, wherein the template corresponds to the presentation patterns.

14. The method for presenting data of claim 11, wherein the instructions comprise pre-defined rendering schemes.

15. A frontend computer device comprising:

a user interface including hardware and software components that make up interface technology supported by the frontend computer device, on which to present data and receive user interaction of different user interaction types based on the interface technology, the interface technology providing a native presentation environment for the frontend computer device in which to present the data and receive the user interaction to cause user interaction functions;

an environment-specific decoder to receive a signal including a basic presentation pattern defining how data is to be presented on the user interface and how different types of user interaction functions are to be interpreted in accordance with the native presentation environment based on a user interaction pattern that represents a specific interaction circumstance, the presentation pattern defined generically for interfaces of different devices having different hardware and software components that make up the interface technology supported by the respective devices, and not specific to the user interface, the presentation pattern being derived as an instantiation of a class by a backend device, wherein the class is based on a template generic with respect to the hardware and software components of the native presentation environment and wherein the class is specific to data for the user interaction pattern, the environment-specific decoder generated based on the template and independent of the class, and wherein the environment-specific decoder is deployed to the frontend computer device prior to the instantiation of the class by the backend device, wherein the environment-specific decoder is to further match the presentation pattern with parameters specific to the user interface as set out in the data specific to the user interaction pattern to generate instructions for presenting data and user interaction functions on the user interface in accordance with the user interaction pattern, and the presentation pattern of the native presentation environment, including matching user interaction native to the hardware and software components of the user interface to data and different types of user interaction functions defined by the template; and a processor to process the instructions to generate a presentation specific to the native presentation environment of the user interface.

16. The computing device of claim 15, wherein the instructions are derived in an enabling environment from templates, and wherein the templates correspond to the presentation pattern of the native presentation environment.

17. The computing device of claim 15, wherein the presentation pattern comprises a pre-defined rendering scheme based on the supported display hardware and software components of the computing device.

* * * * *